United States Patent
Lin (10) Patent No.: US 9,870,214 B2
(45) Date of Patent: Jan. 16, 2018

(54) METHOD FOR DOWNLOADING A PROGRAM

(71) Applicant: BOTHNIC INFORMATION CO. LTD., Changhua County (TW)

(72) Inventor: Kuan-Ju Lin, Changhua County (TW)

(73) Assignee: BOTHNIC INFORMATION CO. LTD. (TW)

( * ) Notice: Subject to any disclaimer, the term of this patent is extended or adjusted under 35 U.S.C. 154(b) by 0 days.

(21) Appl. No.: 14/899,976

(22) PCT Filed: Jun. 20, 2013

(86) PCT No.: PCT/CN2013/077560
§ 371 (c)(1),
(2) Date: Dec. 18, 2015

(87) PCT Pub. No.: WO2014/201660
PCT Pub. Date: Dec. 24, 2014

(65) Prior Publication Data
US 2016/0139904 A1    May 19, 2016

(51) Int. Cl.
*G06F 9/445* (2006.01)

(52) U.S. Cl.
CPC ............. *G06F 8/61* (2013.01); *G06F 8/66* (2013.01); *G06F 9/445* (2013.01); *G06F 9/44521* (2013.01)

(58) Field of Classification Search
None
See application file for complete search history.

(56) References Cited

U.S. PATENT DOCUMENTS

| | | | | |
|---|---|---|---|---|
| 6,735,601 | B1 * | 5/2004 | Subrahmanyam | G06F 8/61 |
| 8,103,863 | B2 * | 1/2012 | Brown | G06F 8/63 |
| | | | | 713/1 |
| 2007/0174353 | A1 * | 7/2007 | Adkins | G06F 11/0727 |
| 2012/0005677 | A1 * | 1/2012 | Fujiwara | G06F 8/65 |
| | | | | 718/1 |

(Continued)

FOREIGN PATENT DOCUMENTS

| CN | 101079955 A | 11/2007 |
|---|---|---|
| CN | 102082807 A | 6/2011 |

(Continued)

OTHER PUBLICATIONS

International Search Report mailed in corresponding International Patent Application No. PCT/CN2013/077560 dated Mar. 27, 2014, consisting of 5 pp. (English translation provided).

*Primary Examiner* — Daxin Wu
(74) *Attorney, Agent, or Firm* — Volpe and Koenig, P.C.

(57) ABSTRACT

A method for downloading a program having at least one file from at least one service terminal to a user terminal is disclosed. The method includes the following steps of segmenting the at least one file into a plurality of blocks, and arranging the plurality of blocks according to a particular read order of the program, wherein the plurality of blocks include a first block and a second block; transmitting the first block to the user terminal; and executing the first block at the user terminal before the second block is transmitted to the user terminal.

20 Claims, 7 Drawing Sheets

(56) References Cited

U.S. PATENT DOCUMENTS

| | | | | |
|---|---|---|---|---|
| 2013/0067449 A1* | 3/2013 | Sannidhanam | ........... | G06F 8/60 717/170 |
| 2013/0167140 A1* | 6/2013 | Androncik | ................ | G06F 8/61 717/175 |
| 2014/0068588 A1* | 3/2014 | Tan | ........................... | G06F 8/67 717/169 |

FOREIGN PATENT DOCUMENTS

| | | |
|---|---|---|
| CN | 103077061 A | 5/2013 |
| TW | 200928980 A | 7/2009 |
| TW | 201232403 A1 | 8/2012 |

\* cited by examiner

| filename | a.exe | | | b.jpg | | | c.dll | | |
|---|---|---|---|---|---|---|---|---|---|
| block | 1 | 2 | 3 | 4 | 1 | 2 | 3 | 1 | 2 | 3 |

Fig. 3

| filename | a.exe | a.exe | c.dll | b.jpg | b.jpg | b.jpg | a.exe | c.dll | c.dll | a.exe |
|---|---|---|---|---|---|---|---|---|---|---|
| block | 1 | 4 | 2 | 1 | 2 | 3 | 3 | 1 | 3 | 2 |

METHOD FOR DOWNLOADING A PROGRAM

RELATED APPLICATIONS

The application claims the benefit of the International Patent Application No. PCT/CN2013/077560, filed on Jun. 20, 2013, at the World Intellectual Property Office, the disclosures of which are incorporated herein in their entirety by reference.

FIELD OF THE INVENTION

The present invention relates to a method for downloading a program, and more particularly to a method for downloading a program from a service terminal to a user terminal.

BACKGROUND OF THE INVENTION

Cloud storage is a mode of network online data storage; that is, the data are stored in multiple virtual servers usually managed by a third party rather than in a dedicated server. Data center operators prepare to store virtualization resources in the back-end and provide them in the way of a storage pool based on customers' demand, and then customers can use the storage pool to store files or objects by themselves. Cloud computing is an internet-based computing mode. Through this mode, the shared software and hardware resources and messages can be provided to computers and other devices as required. Cloud computing describes a new internet-based information technology (IT) service increase, use and delivery model, and usually is involved in providing dynamic, easy to expand functions and often virtualized resources via the internet. Users can access the service software and data, and service providers maintain the infrastructure and the platform to keep the service operating normally. The service software provided by service providers is often called "on-demand software", and is usually charged based on use hours. Users only need to have software and hardware equipment with low complexity to use the service, such that enterprise costs can be saved. Because application programs are supplied centrally, updates can be published instantly without manually updating or installing new software by the user. Thus, cloud computing allows enterprises to more rapidly deploy application programs, reduce the complexity of management and maintain the cost, and allows the rapid reallocating of IT resources to cope with the fast change of enterprise requirements.

One benefit of cloud the concept is that there is no need to purchase various types of hardware equipment and software with powerful processing performance. The maintenance of the hardware equipment and the update of the software are carried out by the service provider, while the user or enterprise tries to "virtualize" the hardware equipment and software. In a communication network, application program virtualization allows the application program at the user terminal to be provided by the service terminal. However, it takes time to download an application program with larger capacity from the service terminal to the user terminal, and the application program can only be installed or executed after the download is finished. This mode of installation after download is suitable for a slow or high latency network environment. Because the bandwidth speed and retardance of a local area network and a wide area network differ greatly, in a mixed environment, this mode does not meet the needs of using an application program soon after choosing it very well.

Figure 1:
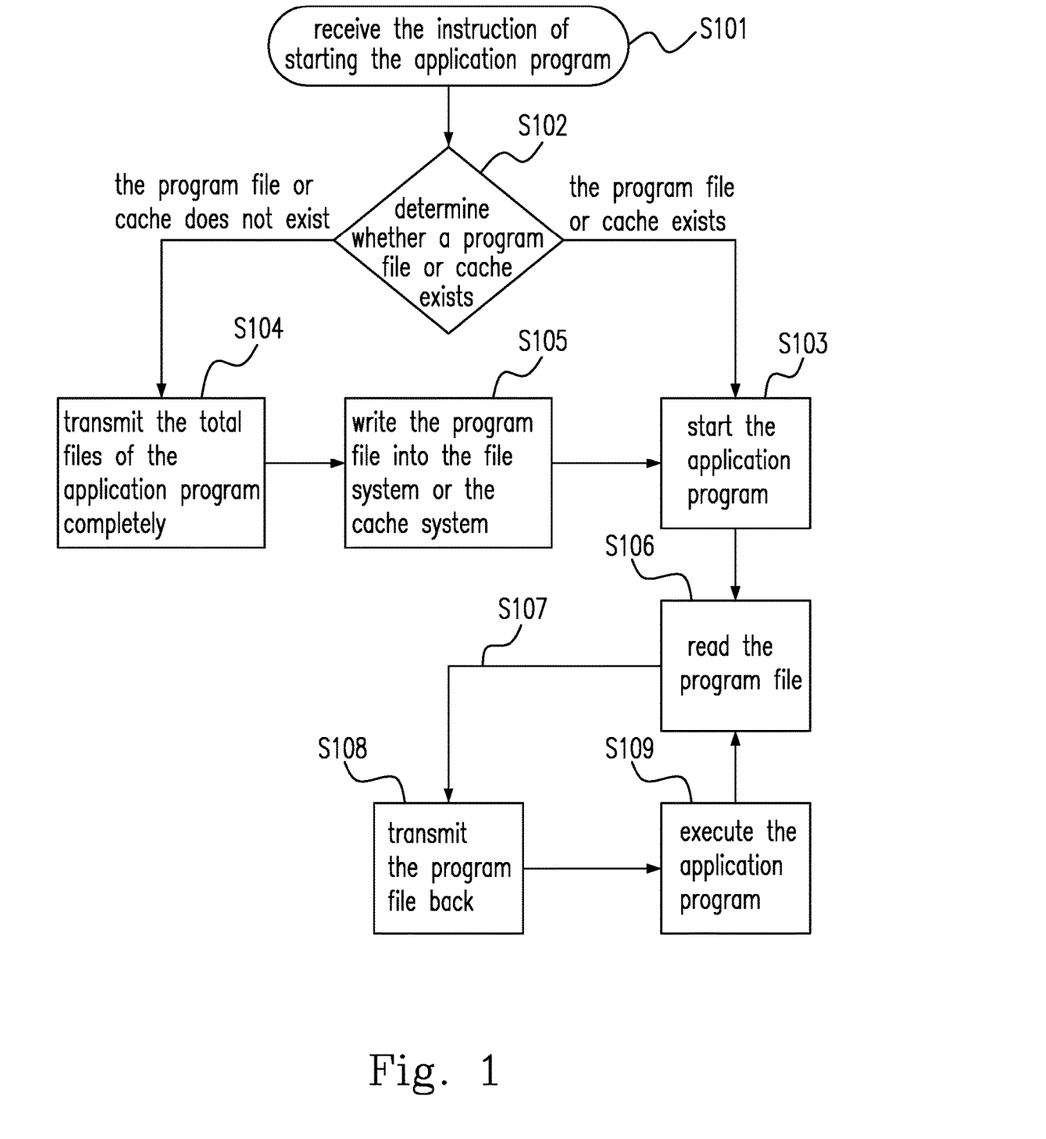
FIG. 1 shows a schematic diagram of a conventional process of downloading an application program.

Please refer to FIG. 1, which shows a schematic diagram of a conventional process for downloading an application program. In step S101, the user terminal system receives the instruction to start the application program. In step S102, the user terminal system determines whether a program file or cache exists, and allows the process to jump to step S103 when the program file or cache exists. In step S103, the operating system in the user terminal starts the application program. In step S102, allow the process to jump to step S104 when the program file or cache does not exist. In step S104, the server transmits all of the files of the application program to the user terminal system in their entirely, and then allow the process to jump to step S105. In step S105, the user terminal system writes the program file into the file system or the cache system, and then allows the process to go back to step S103. After step S103, the process enters Step S106. In step S106, the application program reads the program file. In order to read the program file, step S107 is used. In step S107, the application program will give an instruction to the operating system, and cause the operating system to request the file required by the application program from the file system at the user terminal. Then the file system reads the file from the hard disk and transmits it back to the operating system. In step S108, the operating system transmits it back to the application program. In step S109, execute the application program. Then repeat steps S106-S108 when it is necessary to continue executing the application program.

Figure 2:
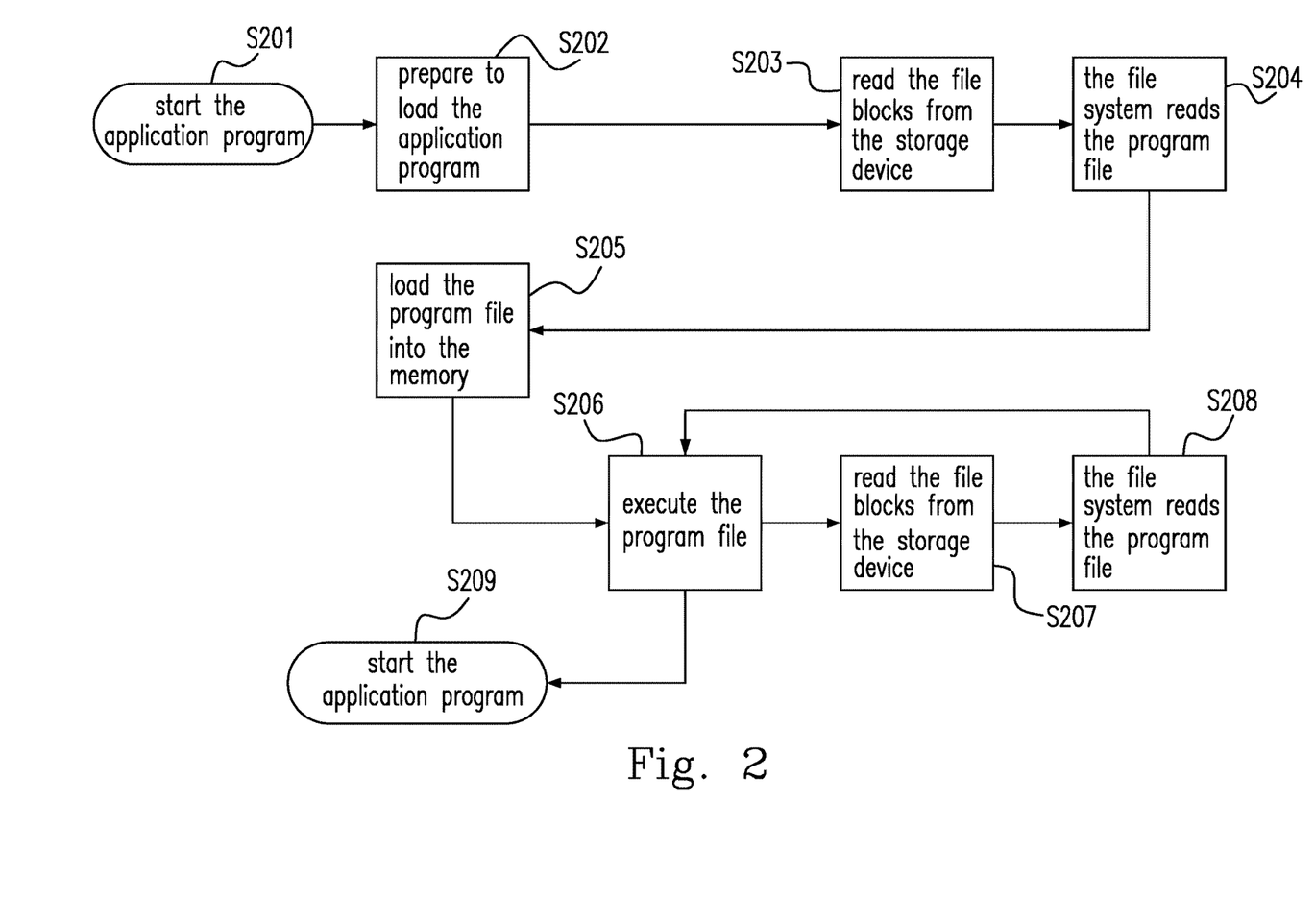
FIG. 2 shows a schematic diagram of a conventional process of executing an application program.

Please refer to FIG. 2, which shows a schematic diagram of a conventional process for executing an application program. The embodiments of steps S103, S106, S107, S108 and S109 in FIG. 1 can be illustrated by FIG. 2. Please refer to FIG. 1 and FIG. 2 simultaneously. In step S201, the user in the user terminal system starts the application program. In Step S202, the operating system at the user terminal system prepares to load the application program. In step S203, the operating system at the user terminal system receives the instructions for the application program to enable the file system to read the file blocks from the storage device. In step S204, the file system in the user terminal system reads the program file in the file blocks. In Step S205, the operating system at the user terminal system loads the program file into the memory. In Step S206, the application program takes over the operating system at the user terminal system to execute the program file, and allows the process to enter step S207 when the application program needs to execute a different process. In step S207, the operating system receives the instructions for the application program to enable the file system to read the file blocks from the storage device, and then allows the process to jump to Step S208. In step S208, the file system reads the program file in the file blocks, and then allows the process to jump to Step S206. In step S206, allow the process to jump to Step S209 to end the application program when the application program does not continue to execute other processes.

Between the service terminal and the user terminal, all the conventional modes of using the application program requires the installation or execution of the application program only after all of the files are downloaded. These modes consume substantial download time when the application program has a large capacity. For the user terminal, it is necessary to wait, which waste time. Thus, it is desirable to have a mode that allows the user terminal to use an application program soon after choosing it without requiring very much download time, and the construction of the hardware equipment with the high computing power as well as the provision and maintenance of program are provided by the service terminal.

SUMMARY OF THE INVENTION

In accordance with one aspect of the present invention, a method for downloading a program is disclosed. The method for downloading a program has at least one file from at least one service terminal to a user terminal. The method includes the following steps of segmenting the at least one file into a plurality of blocks, and arranging the plurality of blocks according to a particular read order of the program, wherein the plurality of blocks include a first block and a second block; transmitting the first block to the user terminal; and executing the first block at the user terminal before the second block is transmitted to the user terminal.

In accordance with another aspect of the present invention, a method for downloading a program is disclosed. The method for downloading a program has a plurality of files, wherein the plurality of files are downloaded one by one from a service terminal to a user terminal, and the plurality of files comprise at least a first file and a second file. The method includes the following steps of transmitting the first file from the service terminal to the user terminal; and executing the first file at the user terminal before the second file is transmitted from the service terminal to the user terminal.

In accordance with another aspect of the present invention, a method for downloading a program is disclosed. The method for downloading a program has an execution file and a resource file from a service terminal to a user terminal. The method includes the following steps of transmitting the execution file from the service terminal to the user terminal; executing the execution file at the user terminal, and acquiring a part of data of the resource file when an execution of the execution file needs a support from the part of data from the resource file to continue the execution; and continuing to execute the execution file when the part of data has been acquired from the service terminal.

In accordance with another aspect of the present invention, a method for downloading a program is disclosed. The method for downloading a program has a plurality of execution files and a plurality of resource files, wherein each of the plurality of execution files is segmented into a plurality of execution blocks, and each of the plurality of resource files is segmented into a plurality of resource blocks to enable the plurality of execution blocks to be downloaded from a service terminal to a user terminal for execution. The method includes the following steps of transmitting a first execution block of the plurality of execution blocks from the service terminal to the user terminal, wherein an execution of the first execution block needs a support from a specific resource block of the plurality of resource blocks; transmitting the specific resource block from the service terminal to the user terminal to complete the pre-execution of the first execution block; and continuing transmitting a second execution block of the plurality of execution blocks to the user terminal when the service terminal has completed transmitting the specific resource block.

By using the method for downloading a program of the present invention, the time for downloading the application program from the service terminal to the user terminal can be saved, the application program can be installed or executed being completely without downloaded, and the need to use an application program soon after choosing it for the enterprise or user is achieved.

DETAILED DESCRIPTION OF THE PREFERRED EMBODIMENTS

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

Figure 3:
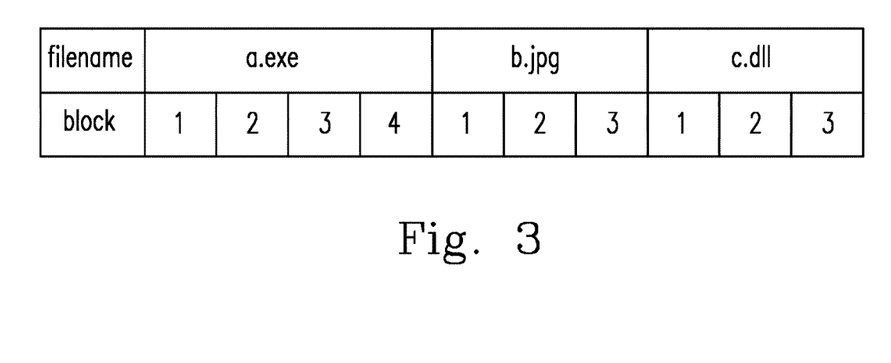
FIG. 3 shows a schematic diagram of the application program file of the present invention.

Please refer to FIG. 3, which shows a schematic diagram of an application program file of the present invention. In the application program file, three types of files a, b, c can be included, such as an execution file with the file extension "exe", a dynamic-link library file with the file extension "dll", and a resource file with the file extension "jpg". In FIG. 3, the execution file a.exe can be divided into four blocks 1-4, the resource file b.jpg can be divided into three blocks 1-3, and the dynamic-link library file c.dll can be divided into three blocks 1-3.

Figure 4:
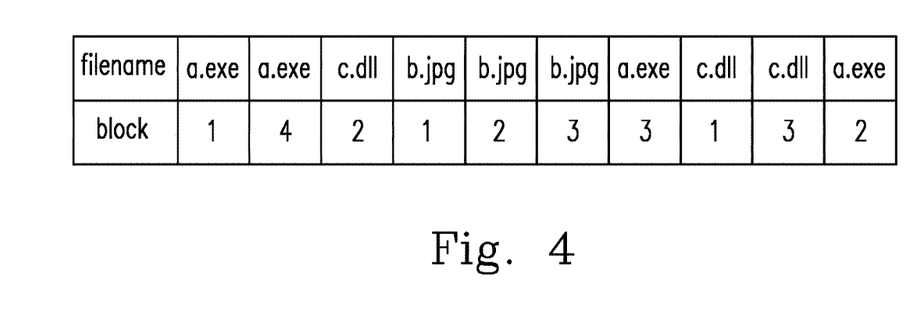
FIG. 4 shows a schematic diagram of arranging the blocks of the program file of the present invention.

Please refer to FIG. 4, which shows a schematic diagram of arranging the blocks of the program file of the present invention. Before downloading from the user terminal to the service terminal, the program file can be arranged according to a particular read order and file blocks required by the common function, and then downloaded sequentially to read and execute the application program via the network. For example, in FIG. 4, the download order is: block 1 of the execution file a.exe, block 4 of the execution file a.exe, block 2 of the dynamic-link library file c.dll, block 1 of the resource file b.jpg and so on. Blocks that are downloaded to the user terminal can be executed first. For example, block 1 of the execution file a.exe can be executed first, then block 4 of the execution file a.exe can be executed, then block 2 of the dynamic-link library file c.dll can be executed, and then block 1 of the resource file b.jpg can be read. The execution does not have to wait until all the files are downloaded. The particular read order can be determined based on a number N of times each block in the plurality of blocks is to be used. A block having a larger N has a prior read order prior to that of another block having a smaller N, and the particular read order is determined based on an original read order when the blocks have the same N. For example, when there is another execution file d.exe downloaded or used more often than the execution file a.exe, downloads and executes the execution file d.exe at the user terminal first, and then downloads and executes the execution file a.exe at the user terminal. For example, when there are no statistics for the use times, they are downloaded according to the order of the program file that the application program needs to use.

Figure 5:
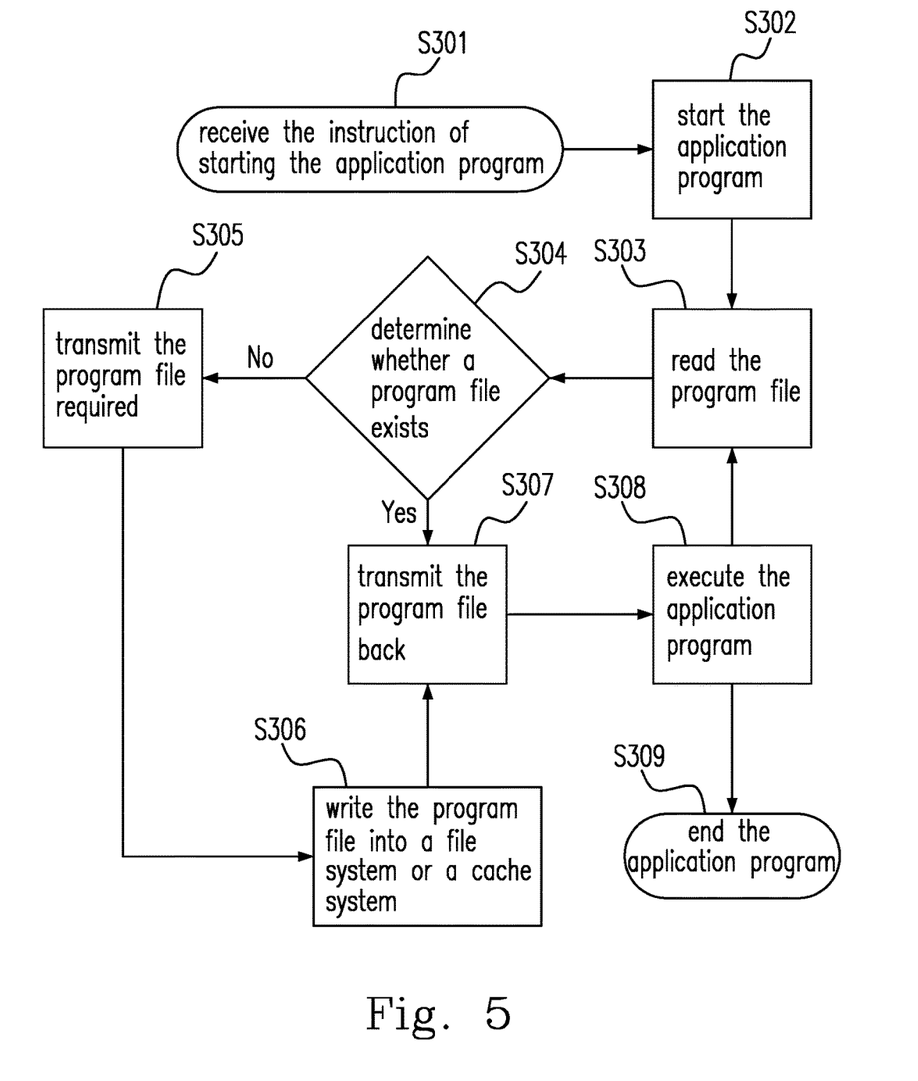
FIG. 5 shows a schematic diagram of a process of downloading a program file immediately according to a first embodiment of the present invention.

Please refer to FIG. 5, which shows a schematic diagram of a process of downloading a program file immediately according to a first embodiment of the present invention. In step S301, the user terminal system receives the instruction to start the application program. In FIG. 5, what is different from the conventional mode is that the process directly enters step S302 after step S301. In step S302, start the application program, and then allow the process to enter step S303. In step S303, read the program file, wherein the application program in the user terminal gives an instruction to the operating system, and allow the operating system to request the files required by the application program from the file system in the user terminal. In step S304, the user terminal system determines whether a program file exists, and allows the process to jump to step S305 when the program file does not exist. In step S305, the user terminal downloads the program file required from the service terminal to the user terminal, and then allows the process to enter step S306. In step S306, the operating system at the user terminal writes the program file into a file system or a cache system, and then allows the process to enter step S307. In step S307, the operating system at the user terminal transmits the program file back to the application program. In step S304, allow the process to directly enter step S307 when the user terminal determines that a program file exists, such that the operating system transmits the program file back to the application program. Then the process enters step S308. In step S308, execute the application program; when other processes need to be executed, and the user determines that a program file does not exist, then repeat steps S303, S304, S305, S306, S307 and S308; if the user determines that a program file exists, then repeat steps S307 and S308. Allow the process to enter step S309 when it is unnecessary to execute other processes to end the application program.

In the first embodiment of the present invention, downloading the program file can be made available by downloading the blocks into the user terminal by way of a multi-threaded mode from the at least one service terminal close to the user terminal to execute. The service provider can configure servers in different areas to enable the user terminal to choose the closest server automatically to download the program file, wherein the service terminal includes the server. Of course, a plurality of servers close to the user terminal can be chosen to download simultaneously to increase the efficiency of downloading the program file. In another embodiment, these file blocks, execution files, resource files and dynamic-link library files can be compressed at the service terminal and then transmitted through the network, and then decompressed at the user terminal to increase an amount of data to be transmitted.

Figure 6:
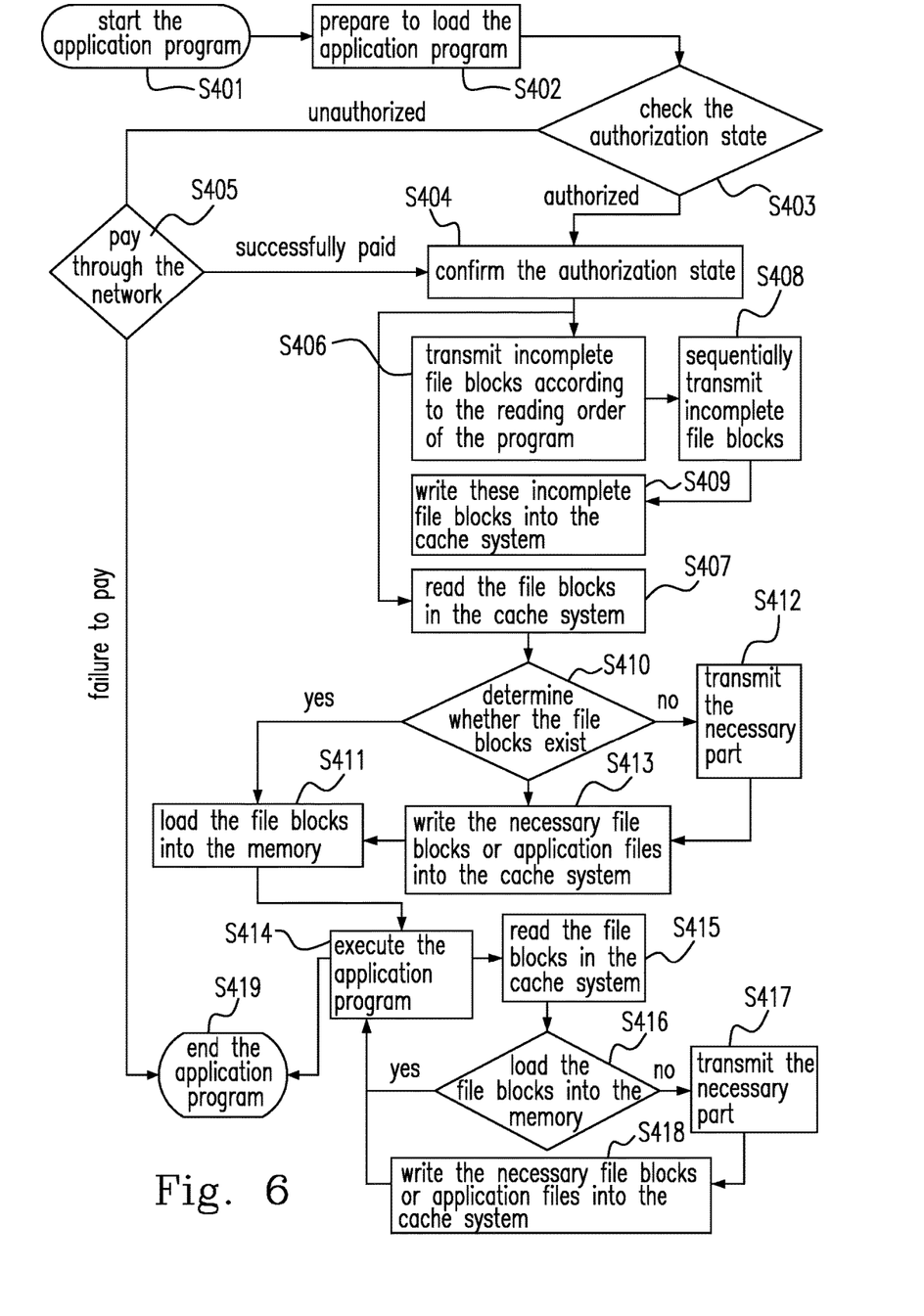
FIG. 6 shows a schematic diagram of a process of downloading a program file immediately according to a second embodiment of the present invention.

Please refer to FIG. 6, which shows a schematic diagram of a process for downloading a program file immediately according to a second embodiment of the present invention. In step S401, the user at the user terminal starts the application program. In step S402, the application program at the user terminal notifies the operating system to prepare to load the application program, but it is necessary to go through step S403 before actual loading. In the step S403, the service terminal checks the authorization state of the user terminal, and allows the process to enter step S404 if the user terminal passes the authorization. In step S404, the service terminal stores the authorized state at the storage device in the user terminal to confirm that the user terminal has passed the authorization, and requests the needed program file to download from the service terminal. In the step S403, allow the process to enter step S405 if the service terminal finds that the user is in the unauthorized state. In the step S405, request the user to pay through the network, and allow the process to enter step S404 when the user's payment has been successfully submitted. Checking the authorization before the application program has loaded into the user terminal can prevent the application program from being altered and bypassing the inspection of the authorization when executing the application program. The application program is provided by the service terminal and cannot be altered by the user terminal. This can prevent pirated software from fleeing hither and thither. Meanwhile, the service terminal can also check the serial number or ID of the storage device, the CPU, the mainboard or the serial number of the network card in the user terminal to confirm the authorization. The service terminal prohibits the download of the program file to the user terminal if the serial number or ID in the user terminal is not authenticated by the service terminal.

In step S404, the storage device at the user terminal can be a virtual hard disk, USB flash drive or hard disk that use different types of buses to connect. The types of buses can include SATA, SCSI, IDE, etc. In another embodiment, the storage device can include all the application program sets and connect to the user terminal. Thus, when the user starts an application program among the application program sets, he can directly load the program file from the storage device connected to the user terminal into the cache in the user terminal to be executed without downloading the program file from the service terminal through the network. Of course, when the program file among the application program sets needs to be updated, the method of immediately connecting to the service terminal to immediately download the program file can be used. In another embodiment, the storage device such as a flash drive can be used as a cache. When a certain application program is going to be used, the program files not needed in the cache can be removed, and the needed program file can be downloaded from the service terminal. For the user, although the flash drive only has a storage capacity of 8 GB, it feels like it has a storage space of 1000 GB. In another embodiment, the storage device can include all the application program sets and embedded operating systems, and connects to the user terminal. The user terminal can directly use the application program set and embedded operating system in the storage device, and does not need to change the set of parameters between the operating system at the user terminal and the application program set in the storage device. The process is allowed to enter the procedure of loading the program file after step S404.

As show in FIG. 6, in step S404, allow the process to enter step S406 and step S407 simultaneously after confirming the authorization at the user terminal. In step S406, the user terminal requests the service terminal to transmit incomplete file blocks according to a particular read order of the program. Then, the process enters step S408, wherein the service terminal sequentially transmits incomplete file blocks to the user terminal. Then, the process enters step S409, wherein the user terminal writes these incomplete file blocks into the cache system. In step S407, the user terminal reads the file blocks in the cache system, and then the process enters step S410, wherein the user terminal determines whether the file blocks exist, and allows the process to enter step S411 when the file blocks exist. In step S411, the operating system at the user terminal loads the file blocks into the memory. In step S410, allow the process to enter step S412 when the file blocks do not exist. In step S412, the user terminal requests the service terminal to transmit the necessary parts, such as the file blocks or program files the user terminal needs, to execute the application program, and then allows the process to enter step S413. In step S413, the user terminal writes the necessary file blocks or program files into the cache system at the user terminal, and then allows the process to enter step S411. Allows the process to enter step S414 after loading the file blocks or program files by the operating system. In step S414, the operating system transmits the file blocks or program files to the application program to execute.

In step S414, the application program can be immediately executed after downloading one file block in the application program without waiting for a complete download of the file blocks or program files. Allow the process to enter the next steps S415, S416, S417 and S418 when subsequent file blocks are needed. The procedures of steps S415-S418 are the same as steps S407, S410, S412 and S413. When the file blocks necessary to execute the application program do not exist in the cache system at the user terminal, the user terminal requests the necessary blocks from the service terminal, and the necessary blocks are downloaded by the service terminal and written into the cache system at the user terminal. Finally, the application program reads the file blocks in the cache system to execute. In step S414, allow the process to enter step S419 when the application program does not need to execute the next procedures to end the application program.

Figure 7:
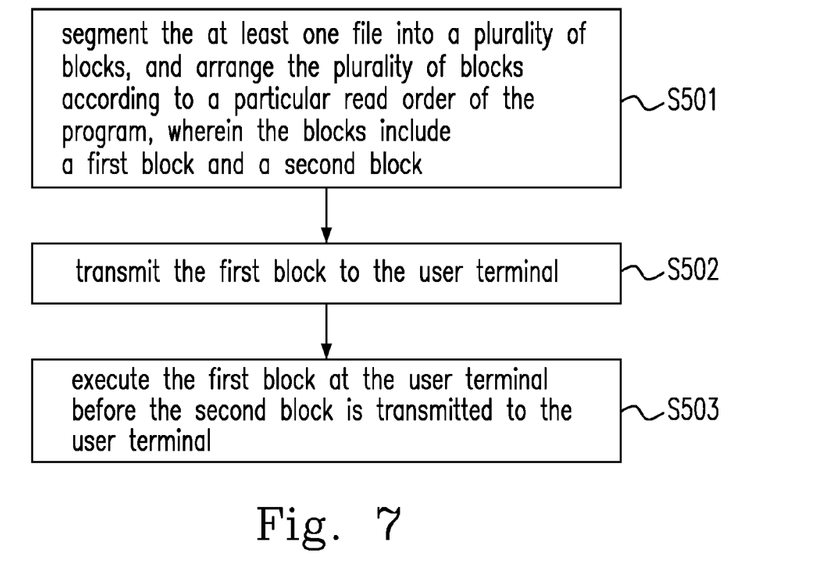
FIG. 7 shows a schematic diagram of a method for downloading a program according to a third embodiment of the present invention.

Please refer to FIG. 7, which shows a schematic diagram of a method for downloading a program according to a third embodiment of the present invention. The program includes at least one file downloaded from a service terminal to a user terminal to execute. For example, the at least one file is the execution file a.exe, the resource file b.jpg, the dynamic link library file c.dll, or a combination thereof. In step S501, segment the at least one file into a plurality of blocks, and arrange the plurality of blocks according to a particular read order of the program, wherein the blocks include a first block and a second block. For example, in FIG. 4, the blocks include block 1 of the execution file a.exe and block 4 of the execution file a.exe. In step S502, transmit the first block to the user terminal. In step S503, execute the first block at the user terminal before the second block is transmitted to the user terminal. For example, execute block 1 of the execution file a.exe at the user terminal before block 4 of the execution file a.exe is transmitted to the user terminal.

In the third embodiment, the method further includes one of the following steps of executing the plurality of blocks from the second block according to the particular read order when the blocks have been stored in a memory at the user terminal. When the blocks have not been stored in the memory at the user terminal, execute the blocks in the memory according to the particular read order after the blocks are downloaded into the memory at the user terminal by way of a multi-threaded mode from the at least one service terminal closest to the user terminal.

Figure 8:
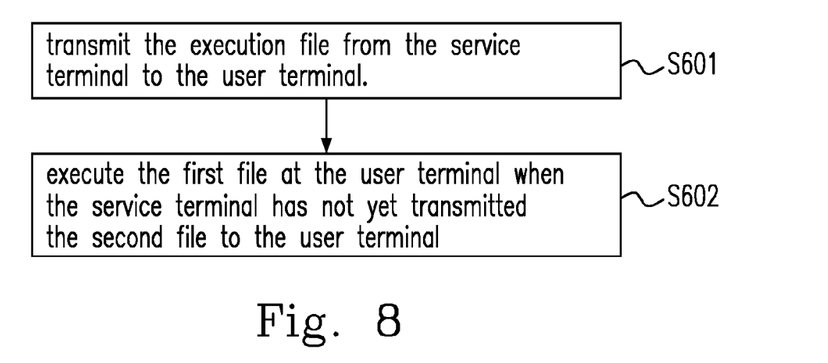
FIG. 8 shows a schematic diagram of a method for downloading a program according to a fourth embodiment of the present invention.

Please refer to FIG. 8, which shows a schematic diagram of a method for downloading a program according to a fourth embodiment of the present invention. The program includes an execution file a.exe and a resource file b.jpg downloaded from a service terminal to a user terminal to execute. The method includes the following steps S601-S602. In step S601, transmit the execution file from the service terminal to the user terminal. In step S602, execute the first file at the user terminal when the service terminal has not yet transmitted the second file to the user terminal.

The fourth embodiment can be applied to a game application program or a multimedia application program. These application programs need to use a large number of audio and video files, i.e. resource files. The downloaded execution file can be executed at the user terminal before the resource file is downloaded to the user terminal. For example, there are dozens of stages in a game application program, and the first stage only needs the program files relevant to the first stage to operate. Wait when the required resource file has not yet been downloaded until obtaining the required resource file to continue the next procedure. The resource files mostly have a large capacity. Thus, if the resource file can be segmented into a plurality of file blocks first, then the necessary file blocks can be acquired according to the requirement of the program, which will be quite efficient for downloading. Of course, the application program can include a plurality of resource files, each of which can also be segmented into a plurality of file blocks, and then the download order of the file blocks can be arranged according to the use frequency. The execution files for installation programs are also have a large capacity, and thus a similar method for the resource files can be used to improve downloading efficiency.

In the fourth embodiment, the method for downloading a program further includes one of the following steps of executing the execution file at the user terminal when the execution file has been stored in a memory at the user terminal. When the execution file has not yet been stored in the memory at the user terminal, execute the execution file after the execution file is downloaded into the memory at the user terminal from a service terminal closest to the user terminal where there are plural service terminals.

Under normal conditions, the resource file itself will not be executed. The resource file will be read when requested by the execution file, and thus the execution file will be downloaded and executed before the resource file. Please refer to FIG. 9, which shows a schematic diagram of a method for downloading a program according to a fifth embodiment of the present invention. The program includes an execution file and a resource file downloaded from a service terminal to a user terminal to execute, e.g. the execution file a.exe and the resource file b.jpg in FIG. 3. The method includes the following steps S701-S702. In step S701, transmit the execution file from the service terminal to the user terminal. In step S702, execute the execution file at the user terminal, and acquire a part of data of the resource file from the service terminal when the execution of the execution file needs a support from the part of data of the resource file to continue the execution. For example, in FIG. 3, the execution file a.exe is executed at the user terminal. Block 1 of the resource file b.jpg is acquired from the service terminal when the execution of the execution file a.exe needs a support from block 1 of the resource file to continue the execution. Then the process enters step S703 to continue executing the execution file when the part of data has been acquired from the service terminal.

Figure 9:
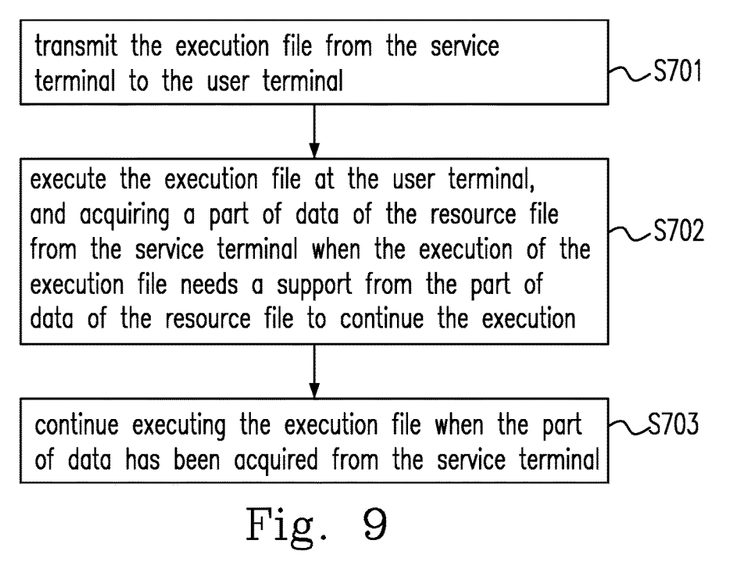
FIG. 9 shows a schematic diagram of a method for downloading a program according to a fifth embodiment of the present invention.

In the fifth embodiment, the method for downloading a program further includes one of the following steps: executing the execution file at the user terminal when the execution file has been stored in a memory at the user terminal; and when the execution file has not yet been stored in the memory at the user terminal, executing the execution file after the execution file is downloaded into the memory at the user terminal from a service terminal closest to the user terminal where there are plural service terminals.

The execution files for program installation usually include a plurality of sub-executable files, a plurality of resource files and a plurality of dynamic-link library files. In order to install the program immediately, the user terminal can download some necessary sub-execution files from the service terminal to execute without waiting for all of the execution files for the program installation having been downloaded to start installation. Please refer to FIG. 10, which shows a schematic diagram of a method for downloading a program according to a sixth embodiment of the present invention. The program includes a plurality of execution files and a plurality of resource files, wherein each of the execution files is segmented into a plurality of execution blocks, and each of the resource files is segmented into a plurality of resource blocks to enable the execution blocks to be downloaded from a service terminal to a user terminal for execution. The method includes the following steps S801-S802. In step S801, transmit a first execution block of the execution blocks from the service terminal to the user terminal, wherein the execution of the first execution block needs a support from a specific resource block of the resource blocks. In step S802, transmit the specific resource block from the service terminal to the user terminal to complete the pre-execution of the first execution block. In step S803, continue transmitting a second execution block of the execution blocks to the user terminal when the service terminal has completed transmitting the specific resource block.

Figure 10:
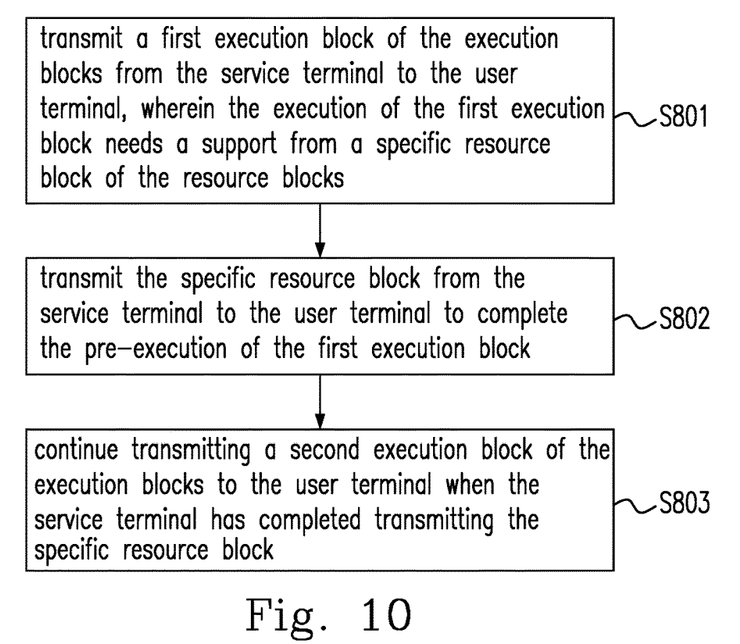
FIG. 10 shows a schematic diagram of a method for downloading a program according to a sixth embodiment of the present invention.

In the sixth embodiment of the present invention, the method for downloading a program further includes one of the following steps: executing the first execution block at the user terminal when the first execution block has been stored in a memory at the user terminal, and executing the second execution block at the user terminal when the second execution block has been stored in the memory at the user terminal. When the first execution block and the second execution block have not yet been stored in the memory at the user terminal, execute one of the first execution block and the second execution block after either of the first execution block and the second execution block is downloaded into the memory at the user terminal from a service terminal closest to the user terminal where there are plural service terminals. The memory includes a virtual hard disk to store the program. The user terminal electrically connects to an external mobile hard disk to store the program to enable the user terminal to directly execute the program. The user terminal electrically connects to an external mobile hard disk to store the program and an embedded operating system to enable the user terminal to directly execute the program without using an internal operating system at the user terminal. The files are compressed at the service terminal and decompressed at the user terminal to increase an amount of data to be transmitted.

EMBODIMENTS

1. A method for downloading a program having at least one file from at least one service terminal to a user terminal, the method comprising the following steps of: segmenting the at least one file into a plurality of blocks, and arranging the plurality of blocks according to a read order of the program, wherein the plurality of blocks include a first block and a second block; transmitting the first block to the user terminal; and executing the first block at the user terminal before the second block is transmitted to the user terminal.

2. The method according to Embodiment 1, further comprising one of the following steps of: executing the plurality of blocks according to the read order when the plurality of blocks have been stored in a memory at the user terminal; and when the plurality of blocks have not been stored in the memory at the user terminal, executing the plurality of blocks in the memory according to the read order after the plurality of blocks are downloaded into the memory at the user terminal by way of a multi-threaded mode from the at least one service terminal closest to the user terminal.

3. The method according to Embodiments 1-2, wherein the read order is determined based on the used times of the plurality of blocks, the read order is further determined based on an read sequence of the plurality of blocks had been read when the used times are the same, and the read order of the file with more used times is prior to the read order of the file with less used times.

4. The method according to Embodiments 1-3, wherein the at least one file includes an execution file, a dynamic-link library (DLL) file, a resource file, and any combination thereof; the execution file includes the first block, and one of the resource file and the dynamic-link library file includes the second block; the memory includes a virtual hard disk to store the program; the user terminal externally connects to an mobile hard disk to store the program to enable the user terminal to directly execute the program in the mobile hard disk according to the read order; the user terminal externally connects to an mobile hard disk to store the program and an embedded operating system to enable the user terminal to directly execute the program in the mobile hard disk according to the read order without using an internal operating system at the user terminal; and the at least one file is compressed at the service terminal and decompressed at the user terminal to increase an amount of data to be transmitted.

5. A method for downloading a program having a plurality of files, wherein the plurality of files are downloaded one by one from a service terminal to a user terminal, and the plurality of files comprise at least a first file and a second file, the method comprising the following steps of: transmitting the first file from the service terminal to the user terminal; and executing the first file at the user terminal before the second file is transmitted from the service terminal to the user terminal.

6. The method according to Embodiment 5, wherein: the first file includes an execution file while the second file includes a resource file; and the method further comprises one of the steps of: executing the first file when the first file has been stored in a memory at the user terminal; and downloading the first file into the memory at the user terminal from a service terminal closest to the user terminal when the first file have not yet been stored in the memory at the user terminal; and the plurality of files include an execution file, a dynamic-link library (DLL) file and a resource file; the memory includes a virtual hard disk for storing the program; the user terminal externally connects to an mobile hard disk to store the program to enable the user terminal to directly execute the program; the user terminal externally connects to an external mobile hard disk to store the program and an embedded operating system to enable the user terminal to directly execute the program without using an internal operating system at the user terminal; and the plurality of files are compressed at the service terminal and decompressed at the user terminal to increase an amount of data to be transmitted.

7. A method for downloading a program having an execution file and a resource file from a service terminal to a user terminal, the method comprising the following steps of: transmitting the execution file from the service terminal to the user terminal; executing the execution file at the user terminal, and acquiring a part of data of the resource file when an execution of the execution file needs a support from the part of data from the resource file to continue the execution; and continuing to execute the execution file when the part of data has been acquired from the service terminal.

8. The method according to Embodiment 7, further comprising one of the following steps of: executing the execution file at the user terminal when the execution file has been stored in a memory at the user terminal; and when the execution file has not yet been stored in the memory at the user terminal, executing the execution file after the execution file is downloaded into the memory at the user terminal from a service terminal closest to the user terminal; the memory comprises a virtual hard disk to store the program; the user terminal externally connects to an mobile hard disk to store the program to enable the user terminal to directly execute the program; the user terminal externally connects to a mobile hard disk to store the program and an embedded operating system to enable the user terminal to directly execute the program without using an internal operating system at the user terminal; and the plurality of files are compressed at the service terminal and decompressed at the user terminal to increase an amount of data to be transmitted.

9. A method for downloading a program having a plurality of execution files and a plurality of resource files, wherein each of the plurality of execution files is segmented into a plurality of execution blocks, and each of the plurality of resource files is segmented into a plurality of resource blocks to enable the plurality of execution blocks to be downloaded from a service terminal to a user terminal for execution, the method comprising the following steps of: transmitting a first execution block of the plurality of execution blocks from the service terminal to the user terminal, wherein an execution of the first execution block needs a support from a specific resource block of the plurality of resource blocks; transmitting the specific resource block from the service terminal to the user terminal to complete the pre-execution of the first execution block; and continuing transmitting a second execution block of the plurality of execution blocks to the user terminal when the service terminal has completed transmitting the specific resource block.

10. The method according to Embodiment 9, further comprising one of the following steps of: executing the first execution block at the user terminal when the first execution block has been stored in a memory at the user terminal, and executing the second execution block at the user terminal when the second execution block has been stored in the memory at the user terminal; and when the first execution block and the second execution block have not yet been stored in the memory at the user terminal, executing one of the first execution block and the second execution block after either of the first execution block and the second execution block is downloaded into the memory at the user terminal from a service terminal closest to the user terminal where there are plural service terminals; the memory includes a virtual hard disk to store the program; the user terminal externally connects to an mobile hard disk to store the program to enable the user terminal to directly execute the program; the user terminal externally connects to an mobile hard disk to store the program and an embedded operating system to enable the user terminal to directly execute the program without using an internal operating system at the user terminal; and the plurality of files are compressed at the service terminal and decompressed at the user terminal to increase an amount of data to be transmitted.

11. A method for downloading a program having at least one file from at least one service terminal to a user terminal, the method comprising the following steps of segmenting the at least one file into a plurality of blocks, and arranging the plurality of blocks according to a particular read order of the program, wherein the plurality of blocks include a first block and a second block; transmitting the first block to the user terminal; and executing the first block at the user terminal before the second block is transmitted to the user terminal.

12. The method of Embodiment 11, further comprising one of the following steps of executing the plurality of blocks from the second block according to the particular read order when the plurality of blocks have been stored in a memory at the user terminal; and when the plurality of blocks have not been stored in the memory at the user terminal, executing the plurality of blocks in the memory according to the particular read order after the plurality of blocks are downloaded into the memory at the user terminal by way of a multi-threaded mode from the at least one service terminal closest to the user terminal.

13. The method of Embodiments 11-12, wherein the particular read order is determined based on a number N of times each block in the plurality of blocks is to be used, a block having a larger N has a prior read order prior to that of another block having a smaller N, and the particular read order is determined based on an original read order when the plural blocks have the same N.

14. The method of Embodiments 11-13, wherein the at least one file includes an execution file, a dynamic-link library (DLL) file, a resource file, and any combination thereof.

15. The method of Embodiments 11-14, wherein the execution file includes the first block, and one of the resource file and the dynamic-link library file includes the second block.

16. The method of Embodiments 11-15, wherein the user terminal includes a memory having a virtual hard disk to store the program.

17. The method of Embodiments 11-16, wherein the user terminal electrically connects to an external mobile hard disk to store the program to enable the user terminal to directly execute the program in the mobile hard disk according to the particular read order.

18. The method of Embodiments 11-17, wherein the user terminal electrically connects to an external mobile hard disk to store the program and an embedded operating system to enable the user terminal to directly execute the program in the mobile hard disk according to the particular read order without using an internal operating system at the user terminal.

19. The method of Embodiments 11-18, wherein the at least one file is compressed at the service terminal and decompressed at the user terminal to increase an amount of data to be transmitted.

20. A method for downloading a program having a plurality of files, wherein the plurality of files are downloaded one by one from a service terminal to a user terminal, and the plurality of files comprise at least a first file and a second file, the method comprising the following steps of transmitting the first file from the service terminal to the user terminal; and executing the first file at the user terminal before the second file is transmitted from the service terminal to the user terminal.

21. The method of Embodiment 20, wherein the first file includes an execution file while the second file includes a resource file; and the method further comprises one of the steps of executing the plurality of files from the second file when the plurality of files has been stored in a memory at the user terminal; and downloading the first file into the memory at the user terminal from a service terminal closest to the user terminal where there are plural service terminals when the plurality of files have not yet been stored in the memory at the user terminal.

22. The method of Embodiments 20-21, wherein the plurality of files include an execution file, a dynamic-link library (DLL) file and a resource file.

23. The method of Embodiments 20-22, wherein the user terminal includes a memory having a virtual hard disk for storing the program.

24. The method of Embodiments 20-23, wherein the user terminal electrically connects to an external mobile hard disk to store the program to enable the user terminal to directly execute the program.

25. The method of Embodiments 20-24, wherein the user terminal electrically connects to an external mobile hard disk to store the program and an embedded operating system to enable the user terminal to directly execute the program without using an internal operating system at the user terminal.

26. The method of Embodiments 20-25, wherein the plurality of files are compressed at the service terminal and decompressed at the user terminal to increase an amount of data to be transmitted.

27. A method for downloading a program having an execution file and a resource file from a service terminal to a user terminal, the method comprising the following steps of transmitting the execution file from the service terminal to the user terminal; executing the execution file at the user terminal, and acquiring a part of data of the resource file when an execution of the execution file needs a support from the part of data from the resource file to continue the execution; and continuing to execute the execution file when the part of data has been acquired from the service terminal.

28. The method of Embodiment 27, further comprising one of the following steps of executing the execution file at the user terminal when the execution file has been stored in a memory at the user terminal; and when the execution file has not yet been stored in the memory at the user terminal, executing the execution file after the execution file is downloaded into the memory at the user terminal from a service terminal closest to the user terminal where there are plural service terminals; the memory comprises a virtual hard disk to store the program; the user terminal electrically connects to an external mobile hard disk to store the program to enable the user terminal to directly execute the program; the user terminal externally connects to a mobile hard disk to store the program and an embedded operating system to enable the user terminal to directly execute the program without using an internal operating system at the user terminal; and the plurality of files are compressed at the service terminal and decompressed at the user terminal to increase an amount of data to be transmitted.

29. A method for downloading a program having a plurality of execution files and a plurality of resource files, wherein each of the plurality of execution files is segmented into a plurality of execution blocks, and each of the plurality of resource files is segmented into a plurality of resource blocks to enable the plurality of execution blocks to be downloaded from a service terminal to a user terminal for execution, the method comprising the following steps of transmitting a first execution block of the plurality of execution blocks from the service terminal to the user terminal, wherein an execution of the first execution block needs a support from a specific resource block of the plurality of resource blocks; transmitting the specific resource block from the service terminal to the user terminal to complete the pre-execution of the first execution block; and continuing transmitting a second execution block of the plurality of execution blocks to the user terminal when the service terminal has completed transmitting the specific resource block.

30. The method of Embodiment 29, further comprising one of the following steps of executing the first execution block at the user terminal when the first execution block has been stored in a memory at the user terminal, and executing the second execution block at the user terminal when the second execution block has been stored in the memory at the user terminal; and when the first execution block and the second execution block have not yet been stored in the memory at the user terminal, executing one of the first execution block and the second execution block after either of the first execution block and the second execution block is downloaded into the memory at the user terminal from a service terminal closest to the user terminal where there are plural service terminals; the memory includes a virtual hard disk to store the program; the user terminal electrically connects to an external mobile hard disk to store the program to enable the user terminal to directly execute the program; the user terminal electrically connects to an external mobile hard disk to store the program and an embedded operating system to enable the user terminal to directly execute the program without using an internal operating system at the user terminal; and the plurality of files are compressed at the service terminal and decompressed at the user terminal to increase an amount of data to be transmitted.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for downloading a program having at least one program file from at least one service terminal to a user terminal having a memory, one operating system (OS), a cache system used to access the memory through the OS and a file system independent of the cache system, the method comprising the following steps of:
    segmenting the at least one program file into a plurality of blocks, and arranging the plurality of blocks according to a particular read order of the program, wherein the plurality of blocks include a first block and a second block;
    transmitting the first block to the user terminal, wherein the OS at the user terminal writes the first block into the cache system;
    obtaining the first block from the cache system; and executing the first block through the file system and the OS at the user terminal before the second block is transmitted to the user terminal, wherein the OS at the user terminal writes the second block into the cache system after the execution of the first block at the user terminal.

2. The method according to claim 1, further comprising one of the following steps of:
executing the plurality of blocks from the second block according to the particular read order when the plurality of blocks have been stored in a memory at the user terminal; and
when the plurality of blocks have not been stored in the memory at the user terminal, executing the plurality of blocks in the memory according to the particular read order after the plurality of blocks are downloaded into the memory at the user terminal by way of a multi-threaded mode from the at least one service terminal closest to the user terminal.

3. The method according to claim 1, wherein the particular read order is determined based on a number N of times each block in the plurality of blocks is to be used, a block having a larger N has a prior read order prior to that of another block having a smaller N, and the particular read order is determined based on an original read order when the plural blocks have the same N.

4. The method according to claim 1, wherein the at least one program file includes an execution file, a dynamic-link library (DLL) file, a resource file, and any combination thereof.

5. The method according to claim 4, wherein the execution file includes the first block, and one of the resource file and the dynamic-link library file includes the second block.

6. The method according to claim 1, wherein the user terminal includes a memory having a virtual hard disk to store the program.

7. The method according to claim 1, wherein the user terminal electrically connects to an external mobile hard disk to store the program to enable the user terminal to directly execute the program in the mobile hard disk according to the particular read order.

8. The method according to claim 1, wherein the user terminal electrically connects to an external mobile hard disk to store the program and an embedded operating system to enable the user terminal to directly execute the program in the mobile hard disk according to the particular read order without using an internal operating system at the user terminal.

9. The method according to claim 1, wherein the at least one program file is compressed at the service terminal and decompressed at the user terminal to increase an amount of data to be transmitted.

10. A method for downloading a program having a plurality of program files, wherein the plurality of program files are downloaded one by one from a service terminal to a user terminal having a memory, one operating system (OS), a cache system used to access the memory through the OS and a file system, and the plurality of program files comprise at least a first program file and a second program file, the method comprising the following steps of:
transmitting the first program file from the service terminal to the user terminal, wherein the OS at the user terminal writes the first program file into the cache system;
obtaining the first program file from the cache system; and executing the first program file through the file system and the OS at the user terminal before the second program file is transmitted from the service terminal to the user terminal, wherein the OS at the user terminal writes the second program file into the cache system after the execution of the first program file at the user terminal.

11. The method according to claim 10, wherein:
the first program file includes an execution file while the second program file includes a resource file; and
the method further comprises one of the steps of:
executing the plurality of program files from the second file when the plurality of program files has been stored in a memory at the user terminal; and
downloading the first program file into the memory at the user terminal from a service terminal closest to the user terminal where there are plural service terminals when the plurality of program files have not yet been stored in the memory at the user terminal.

12. The method according to claim 10, wherein the plurality of program files include an execution file, a dynamic-link library (DLL) file and a resource file.

13. The method according to claim 10, wherein the user terminal includes a memory having a virtual hard disk for storing the program.

14. The method according to claim 10, wherein the user terminal electrically connects to an external mobile hard disk to store the program to enable the user terminal to directly execute the program.

15. The method according to claim 10, wherein the user terminal electrically connects to an external mobile hard disk to store the program and an embedded operating system to enable the user terminal to directly execute the program without using an internal operating system at the user terminal.

16. The method according to claim 10, wherein the plurality of program files are compressed at the service terminal and decompressed at the user terminal to increase an amount of data to be transmitted.

17. A method for downloading a program having an execution file and a resource file from a service terminal to a user terminal having a memory, one operating system (OS), a cache system used to access to the memory through the OS and a file system, the method comprising the following steps of:
transmitting the execution file from the service terminal to the user terminal, wherein the OS at the user terminal writes the execution file into the cache system;
obtaining the execution file from the cache system;
executing the execution file through the file system and the OS at the user terminal, and acquiring a part of data of the resource file when an execution of the execution file needs a support from the part of data from the resource file to continue the execution; and
continuing to execute the execution file when the part of data has been acquired from the service terminal.

18. The method according to claim 17, further comprising one of the following steps of:
executing the execution file at the user terminal when the execution file has been stored in a memory at the user terminal; and
when the execution file has not yet been stored in the memory at the user terminal, executing the execution file after the execution file is downloaded into the memory at the user terminal from a service terminal closest to the user terminal where there are plural service terminals;
the memory comprises a virtual hard disk to store the program;

the user terminal electrically connects to an external mobile hard disk to store the program to enable the user terminal to directly execute the program;

the user terminal electrically connects to an external mobile hard disk to store the program and an embedded operating system to enable the user terminal to directly execute the program without using an internal operating system at the user terminal; and the plurality of program files are compressed at the service terminal and decompressed at the user terminal to increase an amount of data to be transmitted.

19. A method for downloading a program having a plurality of execution files and a plurality of resource files, wherein each of the plurality of execution files is segmented into a plurality of execution blocks, and each of the plurality of resource files is segmented into a plurality of resource blocks to enable the plurality of execution blocks to be downloaded from a service terminal to a user terminal having a memory, one operating system (OS), a cache system used to access the memory and a file system for execution, the method comprising the following steps of:

transmitting a first execution block of the plurality of execution blocks from the service terminal to the user terminal, wherein the OS at the user terminal writes the first execution block into the cache system and executes the execution file through the file system at the user terminal in conjunction with obtaining the first execution block from the cache system, and an execution of the first execution block needs a support from a specific resource block of the plurality of resource blocks;

transmitting the specific resource block from the service terminal to the user terminal to complete the pre-execution of the first execution block; and continuing transmitting a second execution block of the plurality of execution blocks to the user terminal when the service terminal has completed transmitting the specific resource block, wherein the operating system at the user terminal writes the second execution block into the cache system.

20. The method according to claim 19, further comprising one of the following steps of:

executing the first execution block at the user terminal when the first execution block has been stored in a memory at the user terminal, and executing the second execution block at the user terminal when the second execution block has been stored in the memory at the user terminal; and when the first execution block and the second execution block have not yet been stored in the memory at the user terminal, executing one of the first execution block and the second execution block after either of the first execution block and the second execution block is downloaded into the memory at the user terminal from a service terminal closest to the user terminal where there are plural service terminals;

the memory includes a virtual hard disk to store the program;

the user terminal electrically connects to an external mobile hard disk to store the program to enable the user terminal to directly execute the program;

the user terminal electrically connects to an external mobile hard disk to store the program and an embedded operating system to enable the user terminal to directly execute the program without using an internal operating system at the user terminal; and the plurality of execution files are compressed at the service terminal and decompressed at the user terminal to increase an amount of data to be transmitted.

* * * * *